United States Patent [19]

Anick et al.

[11] Patent Number: 5,251,316
[45] Date of Patent: Oct. 5, 1993

[54] METHOD AND APPARATUS FOR INTEGRATING A DYNAMIC LEXICON INTO A FULL-TEXT INFORMATION RETRIEVAL SYSTEM

[75] Inventors: Peter G. Anick, Marlboro; Rex A. Flynn, Belmont, both of Mass.

[73] Assignee: Digital Equipment Corporation, Maynard, Mass.

[21] Appl. No.: 723,229

[22] Filed: Jun. 28, 1991

[51] Int. Cl.$^5$ .............................................. G06F 15/40
[52] U.S. Cl. ................................ 395/600; 364/419.19; 364/DIG. 1; 364/222.81; 364/222.82; 364/282.1; 364/283.1
[58] Field of Search ............... 395/600, 425, 575, 934; 364/419

[56] References Cited

U.S. PATENT DOCUMENTS

| | | | |
|---|---|---|---|
| 4,646,229 | 2/1987 | Boyle | 395/600 |
| 4,914,590 | 4/1990 | Loatman et al. | 364/419 X |
| 4,961,139 | 10/1990 | Hong et al. | 395/600 |

OTHER PUBLICATIONS

David A. Evans "Automatic Indexing Using Selective NLP And First-Order Thesauri" Oct. 30, 1990.
Gerald Salton Automatic Text Processing, pp. i-xiii, 229-312 377-424, 1989.
Lum, V., et al., "Designing DBMS Support for the Temporal Dimension," 1984 ACM, pp. 115-130.

Primary Examiner—Paul V. Kulik
Attorney, Agent, or Firm—Kenyon & Kenyon

[57] ABSTRACT

An information retrieval system including a plurality of indices representative of information stored in the information retrieval system and a dynamic lexicon is disclosed. The system includes memory having a database stored therein, the database being logically divided to include the plurality of indices, an information database having information objects stored therein and a dynamic lexicon which includes a plurality of data items and groups of data items that appear in the information database. A predetermined time variable represents the last time the plurality of indices were reindexed. After changes are made to the lexicon, a time stamp is attached to each one of the plurality of changes to the lexicon to indicate when the change was made to the lexicon. At some specified time interval later, the reindexing process is invoked. This process involves selecting a subset of the plurality of changes made to the lexicon after the predetermined time variable, locating all information objects in the information database that are affected by the plurality of changes to the lexicon, reindexing the portions of the plurality of indices representative of the information objects affected by the changes to the lexicon to reflect the changes in the lexicon, and then updating the predetermined time variable to indicate changes to the lexicon have been processed. The foregoing process is repeated until all changes to the lexicon after the predetermined time have been applied to the plurality of indices.

14 Claims, 11 Drawing Sheets

METHOD AND APPARATUS FOR INTEGRATING A DYNAMIC LEXICON INTO A FULL-TEXT INFORMATION RETRIEVAL SYSTEM

FIELD OF THE INVENTION

The present invention relates to an information retrieval system, and, more particularly, to a full-text information retrieval system that provides incremental reindexing to accommodate a dynamic lexicon.

BACKGROUND OF THE INVENTION

Traditional information retrieval systems process files of information objects, such as records, stored in a database and requests for information from the files. The systems identify and retrieve from the files certain records in response to the information requests. The retrieval of particular records depends on the similarity between the records stored in the database and requests presented to the system by a user. The similarity is measured by comparing values of certain attributes attached to the records and information requests.

Full-text information retrieval systems are used to store information objects containing textual matter, e.g., articles from magazines, newspapers or other periodicals.

To facilitate the retrieval process, articles in a full-text information retrieval system are "indexed" so the articles in the associated database are characterized by assigning descriptors to identify the content of the articles. In full-text retrieval systems, the descriptors can be the actual words that appear in the articles. The process of characterizing the articles, referred to as "indexing," can lead the retrieval system to particular items in the associated database in response to specific requests or "queries" from a user.

Typically, full-text information retrieval systems do not utilize a lexicon which is a dictionary of words or phrases that are maintained in a database. A lexicon can be used to obtain more precise indexing by acting as an intermediary between a user query and the associated database. A user query is processed against the lexicon to obtain a better indication of what the user is attempting to retrieve. Those systems that do use a lexicon to provide additional capabilities to the retrieval system index the articles on a canonicalized representation of the word, such as its citation form, i.e., the word as it would appear in the dictionary.

The lexicons used in prior information retrieval systems have been "static" in that they cannot be modified after article loading begins. The reason for this is that articles are indexed according to the lexicon. Thus, the index will become inaccurate as the lexicon changes. Therefore, an information retrieval system with a static lexicon must rely upon a full database reload to ensure article index consistency with lexicon changes.

The use of a static lexicon is acceptable for retrieval systems having a static database. However, the use of a static lexicon presents a problem in a retrieval system in which new articles are constantly being added, in particular, in areas such as computers, where new words and phrases are always being developed. A user query which incorporates words or phrases not in the lexicon, issued to a retrieval system with a static lexicon will not locate articles containing those words or phrases.

The foregoing problems of prior art full-text information retrieval systems manifest the need for improvement. Specifically, there is a need for a full-text information retrieval system that is capable of supporting a dynamic lexicon while providing for the reindexing of articles as the lexicon changes. Furthermore, reindexing of the articles must not prevent users from accessing the associated database and lexicon concurrently.

SUMMARY OF THE INVENTION

The present invention provides a method and apparatus that utilizes a dynamic lexicon for the incremental reindexing of a plurality of indices representative of information stored in an associated database in a full-text information retrieval system. The present invention allows for incremental reindexing as updates occur to the lexicon to thereby incorporate lexicon changes into the plurality of indices in a timely manner while not disrupting normal system use. To accomplish this, the present invention only reindexes information objects that are truly affected by changes to the lexicon and separates lexicon transactions from potentially long index update transactions, preserving a consistent view of the information database as update transactions occur. The present invention allows the lexicon to be updated without requiring that the plurality of indices to the information objects be updated immediately.

Generally, the operating environment of the present invention includes a general purpose computer system which comprises a computer having memory, and associated peripheral equipment such as disk drives, tape drives and video display terminals. A database of information objects is maintained on the disk drive or some other storage medium in the computer system. The database is logically partitioned to include a database containing the information objects, a lexicon and a plurality of indices representative of the information objects and the lexicon.

The present invention performs a series of tasks after a new information object, e.g., article, is added to the database. Once an article is entered into the information retrieval system, each data item of an information object, e.g., surface form which is the data item as it appears in the text of the information object, of the new article is run through a morphological analysis routine to determine if a matching data item exists in the lexicon. The output of the morphological analysis is a set of corresponding "lemmas," which are lexicon word entries. An example of a surface form is the word "running." The corresponding lemma is the verb, "to run." The citation form of the lemma is the string "run" (which is shared with the lemma for the noun, "a run"). In addition to this, the sequence of lemmas as they are matched in the article is run through a phrase recognizer which determines if corresponding phrases exist in the lexicon. The article is then indexed according to every surface form encountered in the article, the citation form of every lemma matched during morphological analysis, and every phrase recognized.

The result of this indexing process is that if any data items that are not in the lexicon at the time of indexing are detected, the present invention initially indexes the article under the surface forms as they appeared in the text. Later, the articles will have to be reindexed after the new data items and/or new groups of data items, e.g., phrases, that appear in the added articles have been added to the lexicon.

The incremental reindexing process of the present invention can be invoked periodically as a background task, e.g., at the end of each day. This process will update the plurality of indices representative of the articles stored in the associated database according to the new data items and/or groups of data items that have been added to or removed from the lexicon, since the prior invocation of the process.

Depending on the number of lexicon changes and the number of articles affected by the changes, the incremental reindexing process may take a considerable amount of time. While it is running, users of the system are able to query against the database. The present invention maintains a consistent view of the database to a user performing queries by rendering lexicon changes and the corresponding modifications to the article invisible to the user until the background process has completed reindexing all affected articles.

To accomplish this, the present invention arranges the database as a temporal database so that "versions" of the lexicon and the plurality of indices for given times are maintained. Every modification to the database has a time stamp associated with it. This applies to modifications to the article indices as well as modifications to the lexicon. Thus, the database keeps all historical information available so that changes are made in a non-destructive manner and the old information is still accessible.

Changes to the lexicon and the indices are hidden from queries on the database by utilizing a global timestamp which keeps track of the last time the reindexing operation was completed. The value of the global timestamp at the last time the index was updated is stored in a predetermined time variable. Since all data in the database are maintained temporally, queries may be performed against the database as it "existed" at an historical point in time. Therefore, when a user queries against the database, the lexicon that is used as an intermediary to process the query is the lexicon as it existed at the time stored in the predetermined time variable. Similarly, the indices that the user retrieves in resolving the query are retrieved as they existed at the time stored in the predetermined time variable. Since this variable is only updated upon completion of the incremental reindexing operation, a completely consistent view of the database is maintained, even as the incremental reindexing occurs.

When the background incremental reindexing operation begins, it performs a query against the database to determine if any lexicon updates have been made to the database since the last index update time which is represented by the value stored in the predetermined time variable. This is equivalent to finding all the unprocessed lexicon changes. The present invention processes each lexicon change one entry at a time in temporal order, i.e., starting with the earliest lexicon change since the last index update time. It then takes advantage of the existing plurality of indices to determine which articles are affected.

The first step is to find lexicon updates that have not yet been applied to the plurality of indices and to select a subset of the changes made to the lexicon after the predetermined time variable to propagate through the plurality of indices. The present invention then processes the changes to the lexicon one entry at a time in temporal order, i.e., going back to the earliest lexicon update since updating the index. A morphological generator is then invoked to generate all possible surface forms of the entry in the lexicon. These surface forms are not stored in the lexicon. Only lemmas are stored in the lexicon.

After the new lexicon entries are located and all surface forms are generated, the next step is to generate a query to the articles database to locate all articles in the articles database that are affected by the changes to the lexicon. By constructing a query to find articles that contain one of the generated surface forms but not the citation form, the present invention isolates only those articles that need to be reindexed with respect to the citation form of the entry being processed. The next step performed is to reindex portions of the plurality of indices representative of the articles affected by the changes to the lexicon to reflect the changes in the lexicon. The predetermined time variable is updated to indicate changes to the lexicon have been processed and the foregoing process is repeated until all changes to the lexicon after the predetermined time have been applied to the plurality of indices.

DETAILED DESCRIPTION

Figure 1:
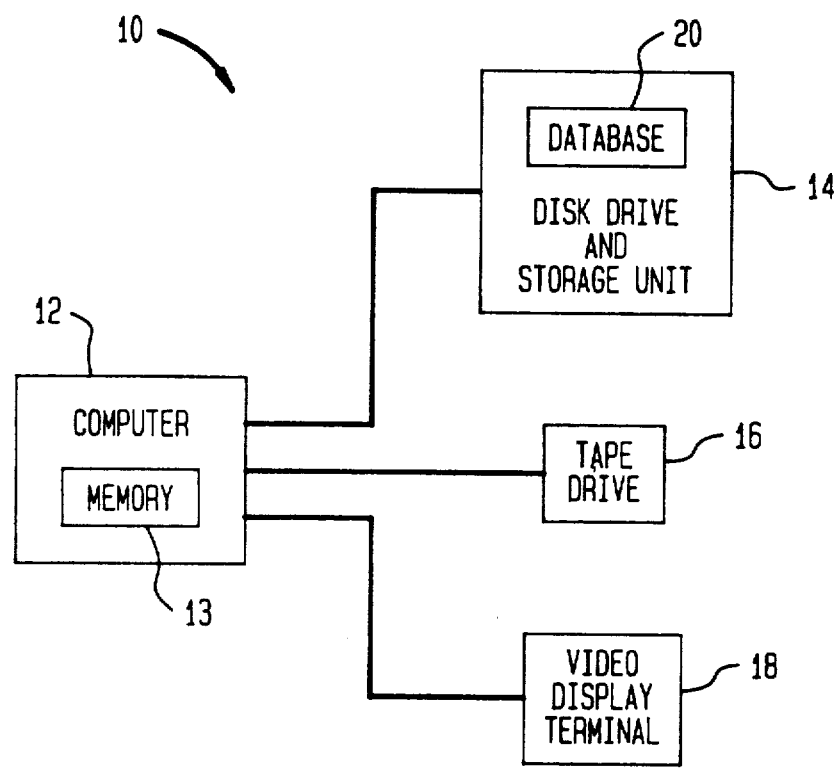
FIG. 1 illustrates an exemplary embodiment of a system for implementing the present invention.

Referring now to the drawings, and initially to FIG. 1, there is illustrated an exemplary embodiment of a system for implementing the present invention. The system 10 comprises a computer 12 with associated peripheral equipment such as a disk drive and storage unit 14, a tape drive 16 and a video display terminal 18. The computer 12 is generally any high performance computer such as a Digital Equipment Corporation VAX 6000-100 having a memory 13 associated therewith. In conjunction with the computer 12, a database is stored on the disk drive 14. The database includes information objects, e.g., articles, a lexicon and a plurality of indices representative of the articles and the lexicon. The video display terminal 18 is the user interface to system 10 and is used for inputting data records or query information and for displaying the retrieved records as a result of such queries.

Figure 2:
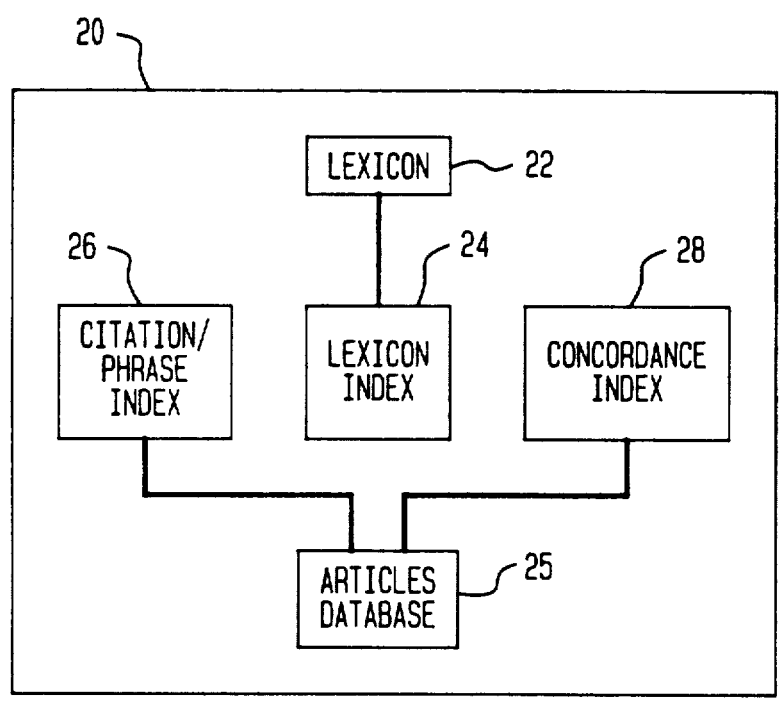
FIG. 2 illustrates the organization of a database for the exemplary embodiment illustrated in FIG. 1.

FIG. 2 illustrates the logical division of the database stored on the disk drive 14. The database 20 comprises a lexicon 22, a lexicon index 24, an articles database 25, a citation/phrase index 26 and a concordance index 28. The database 20 is arranged as a temporal database so that "versions" of the lexicon 22, the lexicon index 24, the articles database 25, the citation/phrase index 26 and the concordance index 28 for given times are maintained. The database 20 keeps all historical information available so when things are changed, they are changed in a non-destructive manner to maintain access to old information. An example of a versioned database is set forth in copending application Ser. No. 07/722,696, entitled "A Method And Apparatus For Indexing And Retrieval Of Object Versions In A Versioned Database," filed on evendate herewith, which is expressly incorporated herein by reference.

The lexicon 22 includes a collection of data items, e.g., lemmas, and groups of data items, e.g., phrases. The lexicon 22 is dynamic in that new lemmas and phrases can be added to the lexicon 22 without the need for performing a complete reload of the lexicon 22. In the exemplary embodiment of the present invention, new lemmas and phrases can be added to or deleted from the lexicon 22 by a user such as a database administrator through the video display terminal 18 and the computer 12.

The lexicon index 24 is representative of the information stored in the lexicon 22 and provides an index into the lexicon 22 which enables the system to retrieve related lemmas for a preselected citation form from the lexicon 22. The articles database 25 is where the text of the various articles are stored. The citation/phrase index 26 is representative of the articles stored in the articles database 25. It provides an index into the articles database 25. The citation/phrase index 26 comprises citation form strings, phrase strings and surface form strings, which, in turn, contain "article identifiers" that are utilized to retrieve specific articles from the articles database 25. The article identifiers are essentially binary representations of specific characteristics of articles, including the location of articles in the articles database 25. The concordance index 28 is also representative of the articles stored in the articles database 25 and provides occurrence information for the text words of the articles in the articles database 25 such as precise text location.

Figure 3:
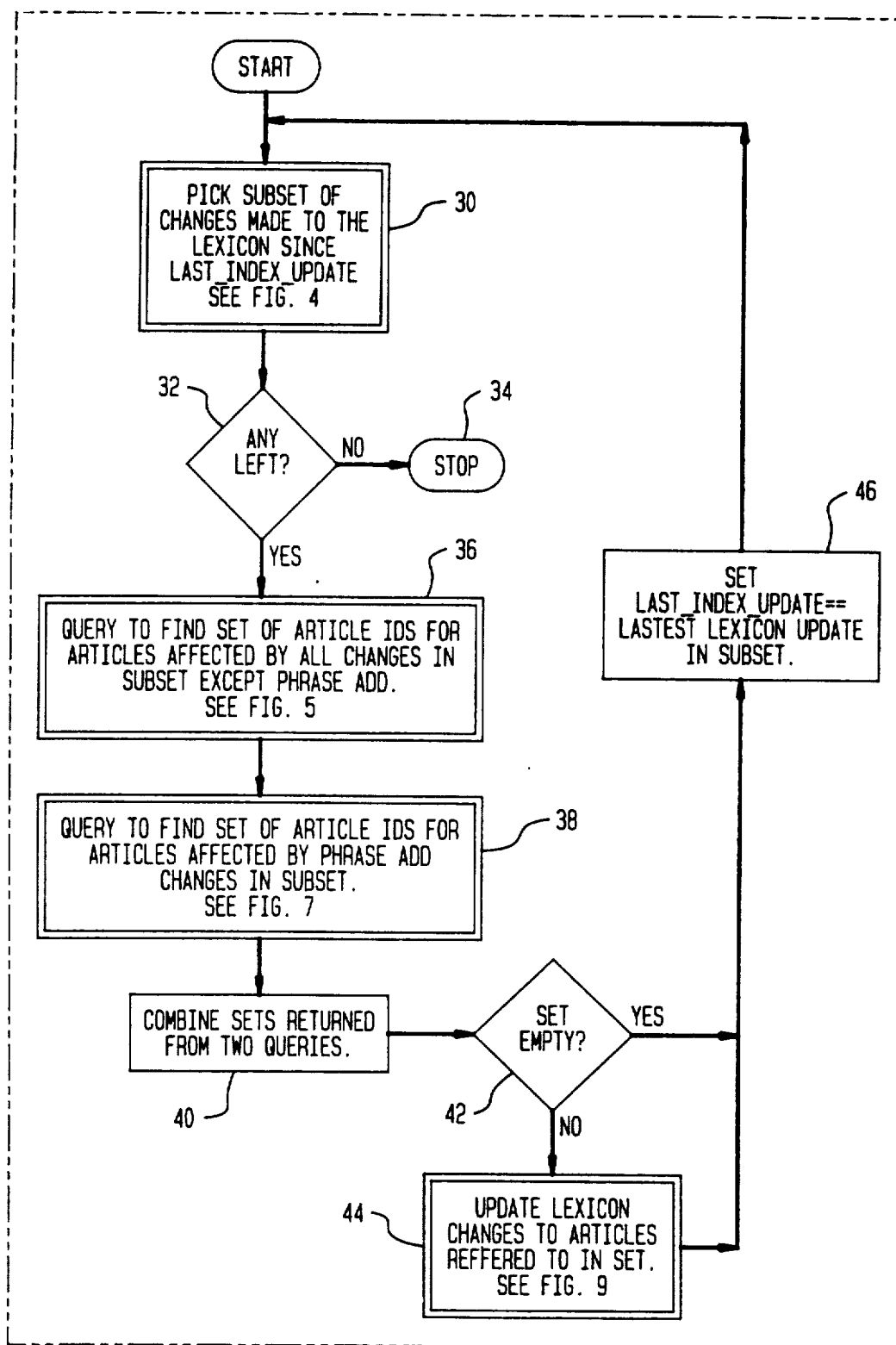
FIG. 3 illustrates the processing flow for reindexing the plurality of article indices to reflect changes to the lexicon.

FIG. 3 provides the overview of the processing involved while the individual software modules invoked in FIG. 3 are discussed in detail in connection with FIGS. 4–11. Referring now to FIG. 3, there is illustrated a flow chart of the processing flow according to the present invention, executed by the computer 12 when the lexicon index 24, the citation/phrase index 26 and the concordance index 28 are updated to reflect changes to the lexicon 22. Typically, the lexicon 22 is updated after articles containing words or phrases not presently in the lexicon 22 have been added to the articles database 25 or when articles, words or phrases have been removed from the articles database 25. The steps illustrated in FIG. 3 provide an overall view of the processing performed by the system 10 to propagate changes to the lexicon 22 through the citation/phrase index 26 and the concordance index 28. Some of the processing steps are representative of calls to other software modules which are illustrated in subsequent figures.

The processing flow illustrated in FIG. 3 is a background task which can be constantly running on the computer 12 or can be invoked periodically by a user through the video display terminal 18. Under either approach, the updating of the indices 26 and 28 will not prevent a user from accessing the database 20 and encountering a consistent view of the database 20.

The computer 12 maintains an internal counter, for example, in the memory 13, to track database 20 events. This counter can be keyed into real-time or can simply be a free running counter. In the exemplary embodiment, the counter provides a "time stamp." Each lemma or phrase added to or removed from the lexicon 22 will have a time stamp, i.e., a number associated with it which is representative of the value of the counter at the time the word is added or removed. When updating, the computer 12 compares the time stamp of each word added or deleted to the time stamp stored in a variable referred to as "last_index_update," which has a time stamp representative of the internal counter value when the last incremental update operation was completed, to ascertain whether a lemma or phrase has been propagated through the indices 26 and 28.

Figure 4:
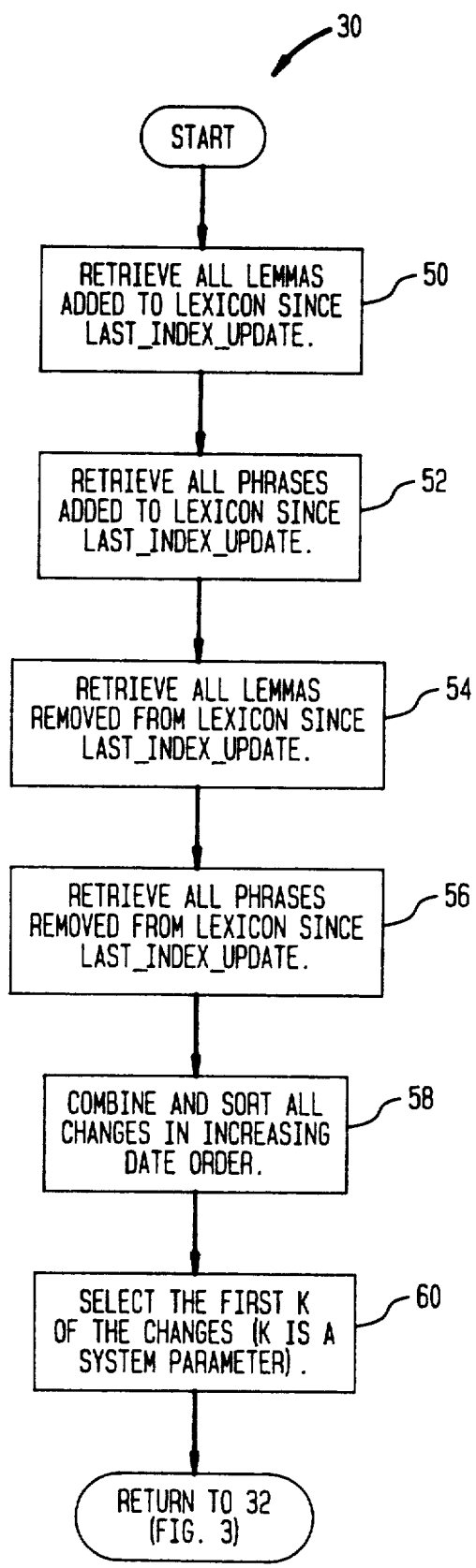
FIG. 4 illustrates the processing flow for selecting a subset of changes to the lexicon to use for reindexing the plurality of article indices.

Upon entering the processing flow, a subset of changes, i.e., words or phrases added to or deleted from the lexicon 22 which have not yet been propagated through the citation/phrase index 26 and the concordance index 28, is selected in step 30. To select the subset, a call to a software module illustrated in FIG. 4 is made which is discussed below. In the exemplary embodiment, the subset is chosen to be as large as possible while minimizing the number of changes propagated at one time. The reason the subset is chosen in this fashion is to optimize the speed of the updating process while minimizing the risks of loss and to avoid repeating the update procedure if the system 10 becomes inoperative, i.e., crashes, during the update procedure.

After the subset is chosen in step 30, a test is performed in step 32 to determine if all changes have been processed. If they have, then the update procedure is complete and control passes to step 34 where the process stops. Note that if the process illustrated in FIG. 3 was configured to run constantly, control would pass back to step 30 and continue to loop between steps 30 and 32 until another subset becomes available.

Figure 5:
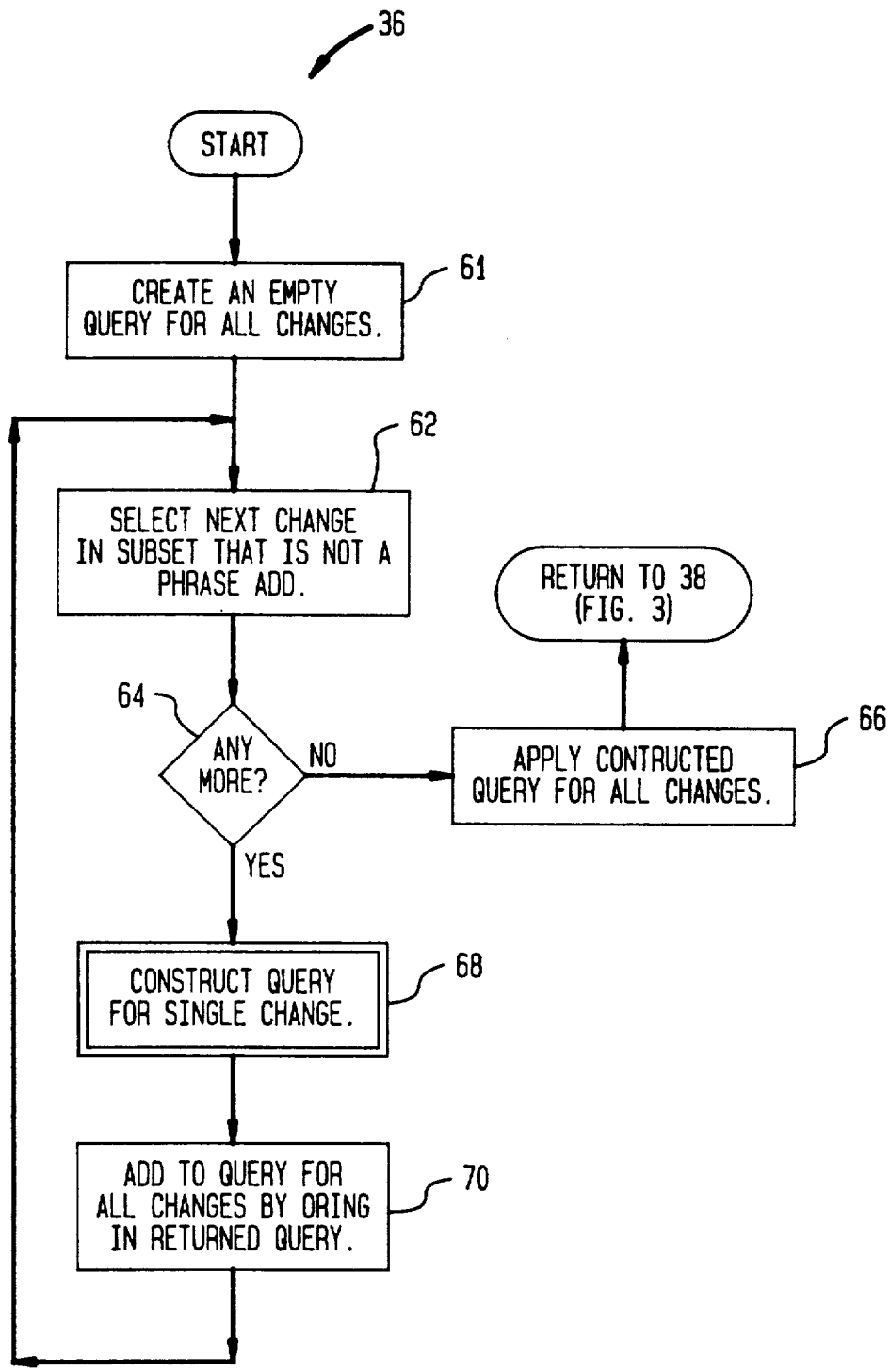
FIG. 5 illustrates the processing flow for locating sets of article identifiers for articles in the database that are affected by the changes to the lexicon.

If it is determined in step 32 that all changes within the selected subset have not been processed, control is passed to step 36. In this step, a software module illustrated in FIG. 5 is invoked to issue a query to find all articles in the articles database 25 affected by all the changes in the subset of changes being processed except for those changes that involve a "phrase add" which is an operation where a new phrase has been added to the lexicon 22. The affected articles are located by using the citation/phrase index 26. The result of the processing in step 36 is that a set of article identifiers is retrieved from the citation/phrase index 26 which represent the articles that are affected by the changes. This set is stored in the memory 13 associated with the computer 12. "Phrase add" changes are processed separately because they involve a different type of query. The citation/phrase index 26 can be used to find all objects which contain all components of the phrase. However, the concordance index 28 must be used to determine whether these components are adjacent to each other and in the correct order. For the changes described in the previous paragraph, examination of the citation/phrase index 26 is sufficient to determine which articles need to be processed.

Control is then passed to step 38 where a query is issued to find all articles affected by "phrase add" changes in the subset of changes being processed. This involves calling a software module illustrated in FIG. 7 and discussed below. The result of the processing in step 38 is that a set of article identifiers is retrieved from the citation/phrase index 26 which are representative of the articles that are affected by "phrase add" changes. This set is also stored in the memory 13 associated with the computer 12.

Control is then passed to step 40 where the set of article identifiers retrieved in step 36 are combined with the set of article identifiers retrieved in step 38. A test is then performed in step 42 to determine if the combined set of article identifiers is empty indicating that no articles are affected by the subset of changes being processed. This is possible if, for example, the computer 12 previously crashed prior to updating the last_index_update variable, but after having stored all the index updates to the disk 14. If the combined set is empty, control passes to step 46 for processing which is discussed below.

If the combined set is not empty, control passes to step 44 where the actual procedure of updating and reindexing the citation/phrase index 26 and the concordance index 28 is performed. This is accomplished by invoking a software module which is fully illustrated in FIG. 9 and is discussed below. The result of the processing in step 44 is that the appropriate article identifiers are updated to either add or remove article identifiers from the citation/phrase index 26.

Control is then passed to step 46 where the value stored in the last_index_update variable is set equal to the value of the time stamp of the most recent change to the lexicon 22 in the selected subset. Once this is done, a user who is utilizing the information retrieval system 10 can locate articles based upon the new lemmas or phrases added to or deleted from the lexicon 22. Control is then passed back to step 30 where the foregoing process is repeated until all changes to the lexicon 22 since the last lexicon update as evidenced by the current value of the last_index_update variable have been processed.

The process presented in this exemplary embodiment, as illustrated in FIGS. 3-11, incorporates a number of optimizations which enhance the performance of the background incremental reindexing process. The optimizations are, in part, to accommodate the way the concordance index 28 is stored in the exemplary embodiment.

In the exemplary embodiment, portions of the concordance index 28 are stored with the articles themselves in the articles database 25. An entry in the concordance index 28 for a particular article will return, given a surface form/citation form/phrase, the precise locations of all occurrences of the term or phrase in the text of the article.

The concordance index 28 is used to display all lines in all articles where a particular word occurs. The manner in which this is accomplished in the exemplary embodiment is to perform a lookup first in the citation/phrase index 26 to retrieve all the associated article identifiers, and then to lookup each article, retrieve its associated entry in the concordance index 28, and find all the line locations in the text of that article. As discussed below, the concordance index 28 is also useful for finding articles which contain a particular phrase.

During the updating of the citation/phrase index 26 and the concordance index 28, portions of the indices 26 and 28 are maintained in the memory 13 (FIG. 1). As the indices 26 and 28 are updated, the changes are not immediately stored to the disk 14. Subsequent changes to the same indices can then be processed before storing to the disk 14. This saves on Input/Output ("I/O") operations, which can be time consuming and, therefore, slow down system performance. There are two limitations to performing the changes in the memory 13 and deferring disk update. The first is that the memory 13 is limited in size, and thus may not be able to incorporate all index updates. The second is that in a potentially long update transaction, if the computer 12 crashes, all the processing represented by the updates in the memory 13 may be lost.

Since the memory 13 is limited, the goal in optimizing the updates to the indices is to collect all the changes that apply to the same item. For the citation/phrase index 26, one index entry lists all the articles that contain a particular term. Thus, consideration of the citation/phrase index 26 alone would indicate that the correct order to update the citation/phrase index 26 and the concordance index 28 is to take each lexicon change in turn, find the appropriate articles via a query, and update the index entry in the memory 13. That index entry can then be stored to the disk 14. On the other hand, every portion of the concordance index 28 that is stored with each article must be updated with corresponding location information. Multiple lexicon changes may apply to the same article, and therefore to the same concordance portion. Consideration of concordance index 28 alone would indicate that al unprocessed lexicon changes as they apply to one article be processed at once, before storing the changes to the concordance index 28 to the disk 14.

Thus, the attempt at optimizing the incremental reindexing operation encounters a number of conflicts. The first is trading off long update transactions where all disk writes are deferred and, therefore, I/O is reduced, against potential crashes. The second is dealing with memory limitations that force storing changes to the disk 14. The third is in trading off ordering the updates by lexicon changes and keeping the updates to the same entry in the citation/phrase index 26 together against ordering the updates by article and keeping the updates to the same portion of the concordance index 28 together.

Figure 7:
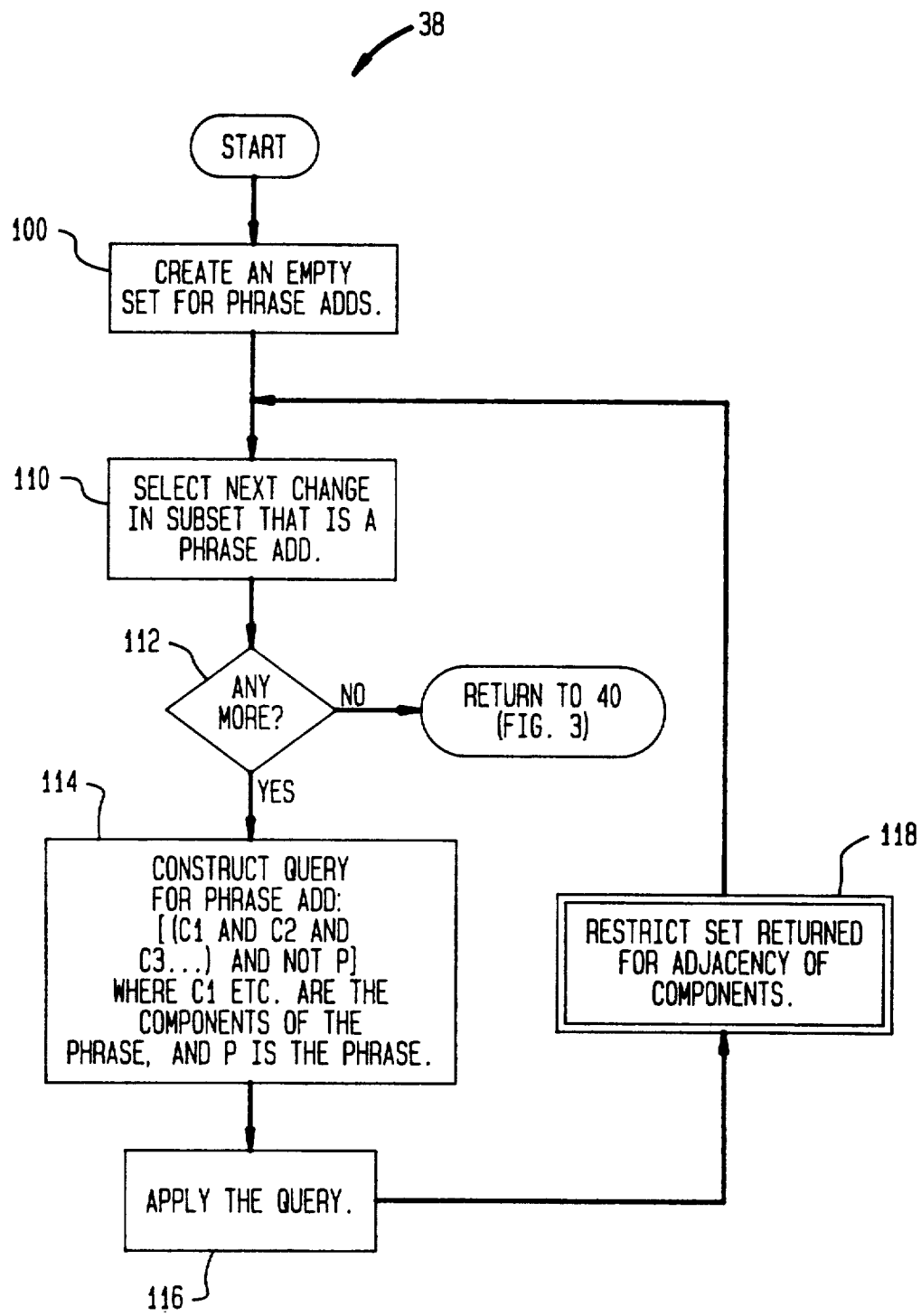
FIG. 7 illustrates the processing flow for locating a set of article identifiers for articles in the database that are affected by "phrase add" changes to the lexicon.
Figure 8:
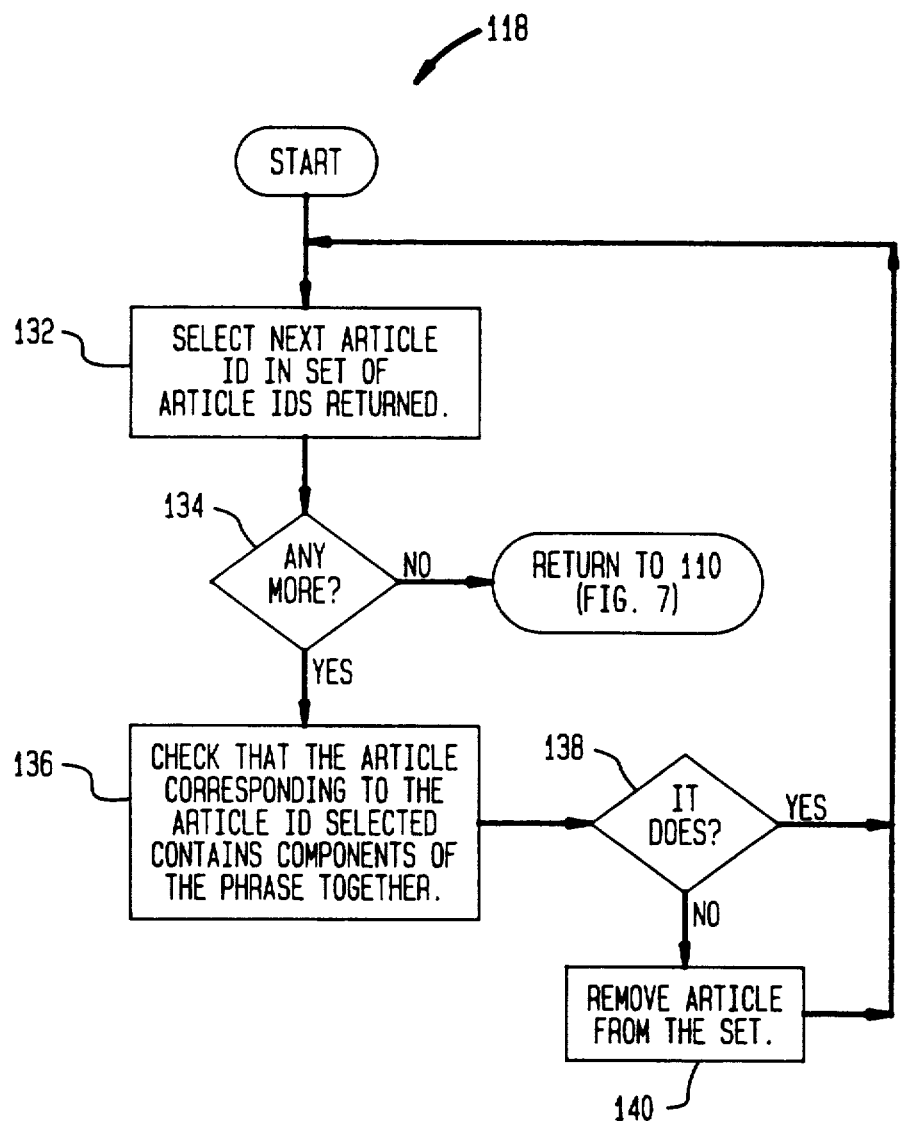
FIG. 8 illustrates the processing flow for determining if the retrieved articles contain the actual phrase being added.
Figure 9:
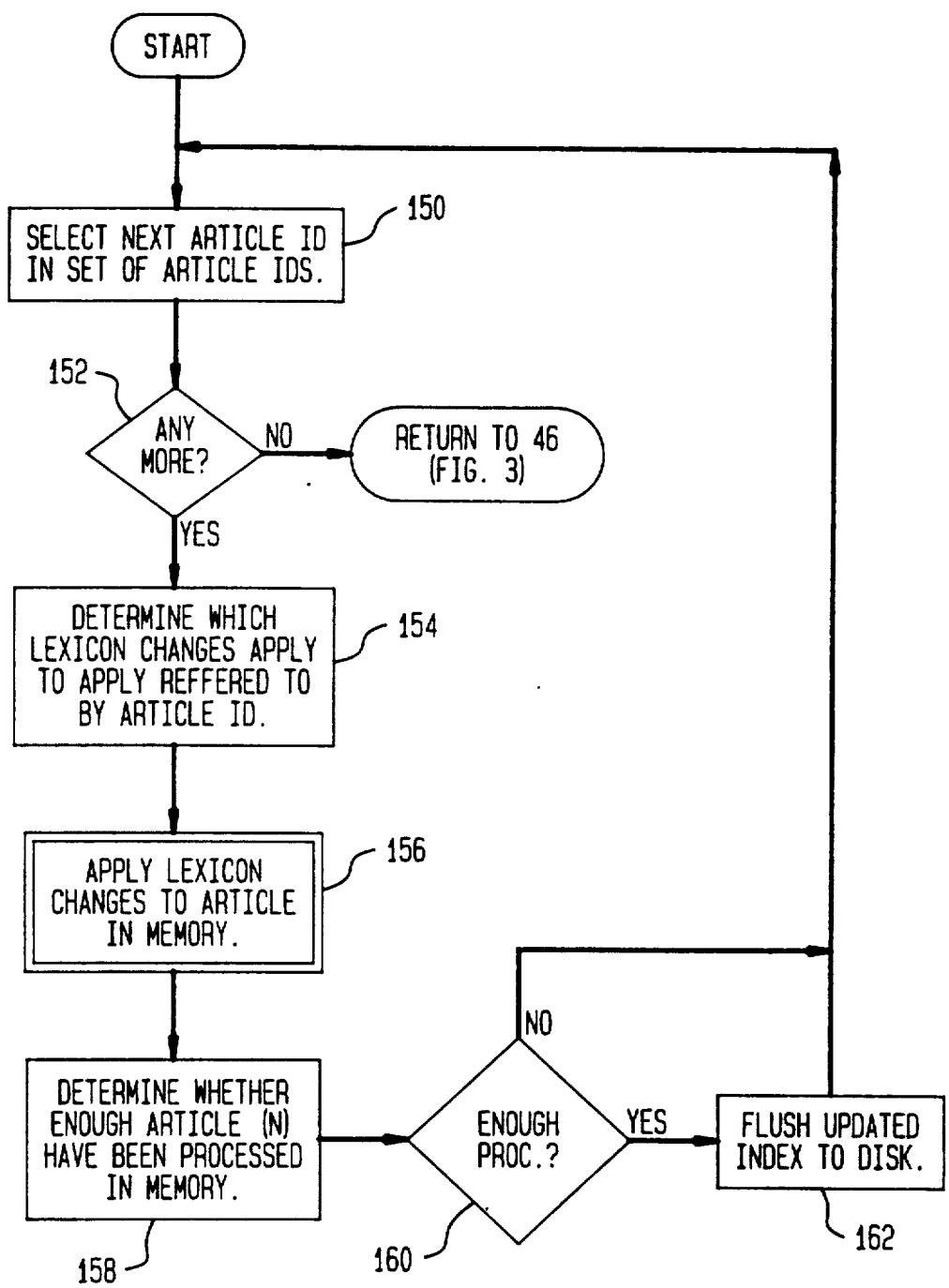
FIG. 9 illustrates the processing flow for updating the article indices to reflect the changes to the lexicon.

In this exemplary embodiment, the overall processing as illustrated in FIGS. 3-11 is ordered so that an outer programing loop, which takes all the lexicon updates since last index update time, picks a subset of these updates in date order, and processes them all at once. This is illustrated in FIG. 3 and is described above. An inner programing loop nested within the outer loop, picks a subset of all of the articles affected by the set of lexicon changes being processed, and processes this subset of articles all at once in the memory 13, before storing the associated changes to the disk 14. This is illustrated in FIG. 9 and discussed below. Within the inner loop, each article is processed one at a time. For each article, every associated lexicon change is processed, in the memory 13, one at a time.

Two system-wide parameters are defined to control this process. A first parameter K is defined as the maximum number of lexicon updates that are processed at once in the outer loop. A second parameter N is defined as the maximum number of articles that are processed against this subset of lexicon changes in the memory 13, before storing these changes to the disk 14. The last_index_update variable is updated after the outer loop has completed. Once this is done, the subsequent iteration of the loop will proceed with the next set of lexicon changes. If the computer 12 crashes before the outer loop completes and the variable last_index_update is updated, the incremental reindexing process will restart at the beginning of the outer loop. Although the outer loop may not have completed as a result of a computer crash, a number of iterations of the inner loop may have completed. The incremental reindexing operation has been designed so that the index updates need only be performed starting from the last time changes were stored to the disk 14 in the inner loop. There is no special processing needed to take care of this. If the updates for a particular subset of articles have been stored to the disk 14 before a computer crash, when the reindexing process is resumed, the query to find all affected articles will no longer return the subset stored.

To fully describe the reindexing operation of the present invention, a detailed discussion of the processing is set forth below. The first step involves calling a software module illustrated in FIG. 4 and discussed below.

Referring now to FIG. 4, there is illustrated the processing flow of a software module for picking a subset of changes made to the lexicon 22 having a value associated with it which is less than the value of the last_index_update variable required by step 30 of FIG. 3. Upon entering the processing flow, all lemmas added to the lexicon 22 having time stamps associated therewith that are greater than the time stamp stored in the last_index_update variable are retrieved in step 50. Similarly, all phrases added to the lexicon 22 having time stamps associated therewith that are greater than the time stamp stored in the last_index_update variable are retrieved in step 52. Next, all lemmas and phrases removed from the lexicon 22 having time stamps associated therewith that are greater than the time stamp stored in the last_index_update variable are retrieved in steps 54 and 56, respectively. Control is then passed to step 58 where all lemma and phrase changes retrieved are combined and then sorted in increasing "date" order where the lemma or phrase having the lowest time stamp will be at the bottom of the list. A subset of the list complied in step 58 is then selected in step 60 based upon the parameter K which is a number chosen to optimize the update procedure as discussed above. Control is then returned to step 32 in FIG. 3.

Upon returning to step 32, a test is performed to determine if any changes in the subset of changes to the lexicon 22 have not been processed. As discussed above, if they have, then the update procedure is complete and control passes to step 34 where the process stops. If it is determined in step 32 that all changes within the selected subset have not been processed, control is passed to step 36 where a software module illustrated in FIG. 5 is invoked to construct a query to find articles affected by all changes in the selected subset of changes except for "phrase add" changes. Control is passed to step 61 from step 32 of FIG. 3 where an empty query is created which involves essentially clearing an area in the memory 13 where the desired query can be constructed. Control is then passed to a loop comprising steps 62, 64, 66, 68 and 70 to construct the query. A single change to the lexicon 22 from the selected subset of changes to the lexicon 22 is added to the query on each pass through this loop as will now be discussed.

Upon entering the loop, the next, or if this is the first time through the loop, the first change to the lexicon 22 from the subset of changes that is not a "phrase add" operation is selected in step 62. It is then determined in step 64 if there are any changes to the lexicon 22 left in the subset of changes to the lexicon 22 selected that have not been added to the query being constructed. If there are more, control is passed to step 68 to construct a query for the change to the lexicon 22 selected in step 62. The query created in step 68 is then added to the query for all changes to the lexicon 22 in the subset by ORing the two queries in step 70.

Figure 6:
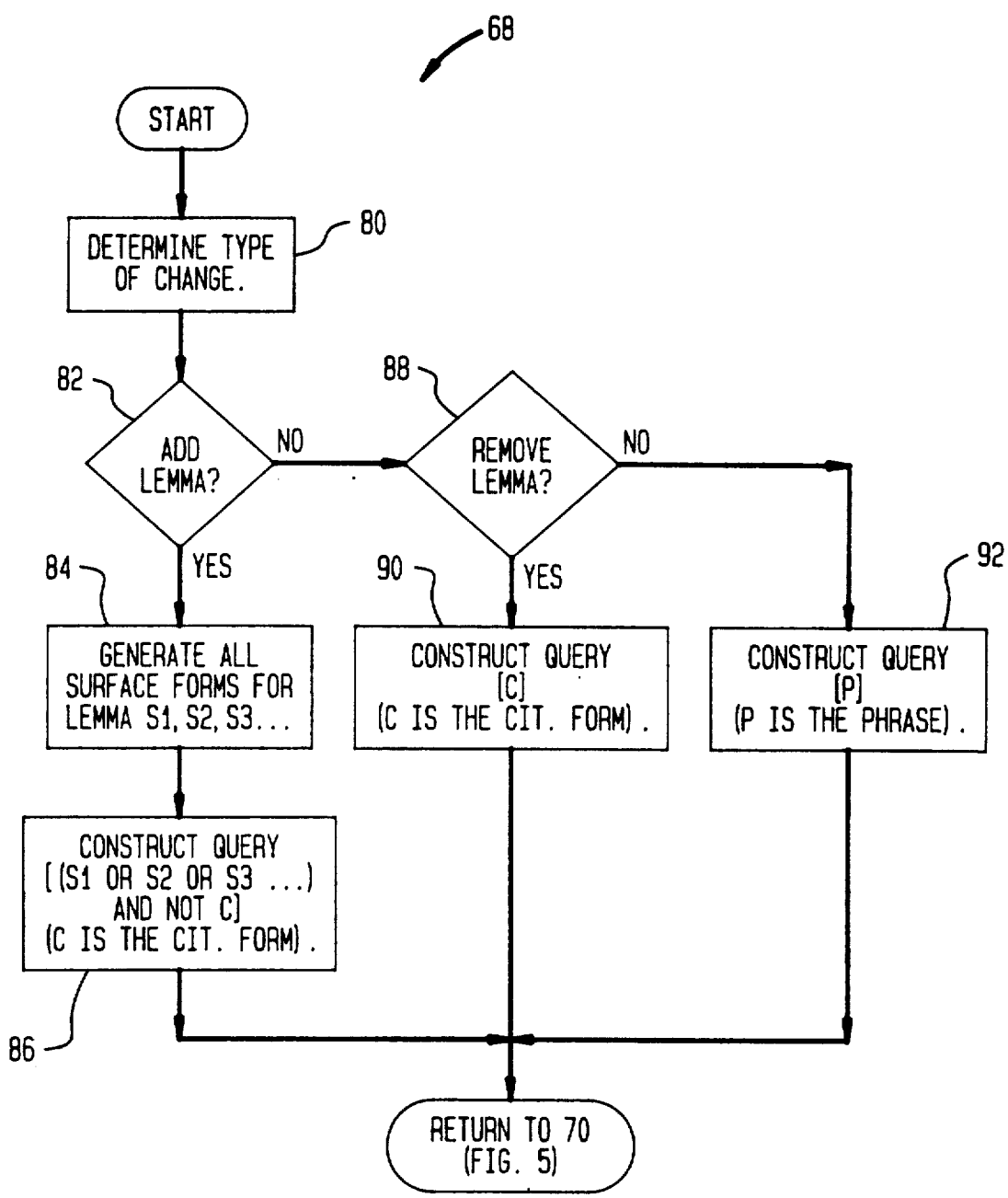
FIG. 6 illustrates the processing flow for constructing a query for a word change to the lexicon.

The processing that is involved in step 68 is performed by a separate software module which is fully illustrated in FIG. 6. Referring now to FIG. 6 to describe how a query is constructed for a single change, control is passed to step 80 from step 64 of FIG. 5. Steps 80, 82 and 88 determine the type of change that is currently being processed. In step 82, a test is performed to determine if the change is an "add lemma to the lexicon 22" operation. If the change is an "add lemma" operation, then control is passed to step 84 where all surface forms for the lemma to be added are generated using a morphological generator such as the one described in copending application Ser. No. 07/723,145, entitled "Method and Apparatus For Efficient Morphological Text Analysis Using A High-Level Language For Compact Specification Of Inflectional Paradigms," filed on even date herewith. This application is expressly incorporated herein by reference. Control is then passed to step 86, in which a query expression is constructed using the string of the various surface forms of the lemma generated in step 84, which looks like [(S1 OR S2 OR S3 . . .) AND NOT C], where each "S" is one of the surface forms, and "C" is the citation form for the lemma. This query is formed to find all articles which are described in the citation/phrase index 26 as containing at least one of the surface forms, but are described in the citation/phrase index 26 as not containing the citation form of the lemma to be added. Control is then returned to step 70 in FIG. 5 to continue in the processing loop of FIG. 5.

If it is determined in step 82 that the change does not indicate an "add lemma to the lexicon 22" operation, then control passes to step 88 to determine if the change indicates a "remove lemma from the lexicon 22" operation. If it does, then a query is constructed utilizing the citation form of the lemma in step 90. Tis query is formed to find all articles which are described in the citation/phrase index 26 as containing the citation form of the lemma to be removed. Control is then returned to step 70 in FIG. 5 to continue in the processing loop of FIG. 5.

If it is determined in step 88 that the change does not indicate a "remove lemma from the lexicon 22" operation, then the change must be "phrase remove from the lexicon 22" operation. To process this change, control passes to step 92 to construct a query utilizing the phrase to be removed. This query is formed to find all articles which are described in the citation/phrase index 26 as containing the phrase to be removed. Control is then returned to step 70 in FIG. 5 to continue in the processing loop of FIG. 5.

Returning now to FIG. 5 to complete the description of the processing flow, control is passed to step 70 in which the query created is then added to the query for all changes to the lexicon 22 in the subset by ORing the two queries. The loop is then repeated by returning control to step 62 to select the next change to the lexicon 22 until all changes have been processed as detected in step 64. When this occurs, control is passed to step 66 where the constructed query is applied to the citation/phrase index 26 to retrieve the set of all article identifiers affected by all the changes to the lexicon 22 except for "phrase add" operations. The retrieved article identifiers are stored in the memory 13 associated with the computer 12. Control is then returned to step 38 in the processing flow of FIG. 3.

Referring now to FIG. 7, there is illustrated the processing flow of a software module for constructing a query to find the set of article identifiers affected by all "phrase add" changes in the selected subset of changes required by step 38 of FIG. 3. Upon entering the processing flow, control is passed from step 38 of FIG. 3 to step 100 of FIG. 7 where an empty query for "phrase add" operations is created from which the desired query can be constructed. Control is then passed to a loop comprising steps 110, 112, 114, 116 and 118 to construct the query.

Upon entering the loop, the next, or if this is the first time through the loop, the first "phrase add" change to the lexicon 22 from the subset of changes is selected in step 110. It is then determined in step 112 if there are any "phrase add" changes to the lexicon 22 left in the subset of changes to the lexicon 22 selected that have not been added to the query. If there are more, control is passed to step 114 to construct a query for the "phrase add" change. The query constructed in step 114 comprises ANDing the citation forms of the words that are the components of the phrase being added but excluding the phrase to be added. The query is constructed in this manner to facilitate the retrieval of all article identifiers for articles containing components of the phrase to be added but not the phrase itself. This query is then applied to the citation/phrase index 26 in step 116 to retrieve article identifiers that contain all of the components of the phrase. Next, step 118 determines if the articles represented by the article identifiers retrieved contain the actual phrase to be added by examining their corresponding entries in the concordance index 28. The processing that is involved in step 118 is performed by a separate software module which is fully illustrated in FIG. 8.

Reference is now made to FIG. 8 to describe the processing flow of a software module which determines if the retrieved articles contain the actual phrase being added. Control is passed to a loop comprising steps 132, 134, 136, 138 and 140 to restrict the set of article identifiers that contain the components of the phrase to be added that was generated in step 116 of FIG. 7. Upon entering the loop, the next, or if this is the first time through the loop, the first article identifier from the set of article identifiers retrieved is selected in step 132. It is then determined in step 134 if there are any more retrieved article identifiers left to be processed. If there are more, control is passed to step 136 to determine if the article represented by the current article identifier contains the components of the phrase to be added together. This is done by examining the article's corresponding entries in the concordance index 28 to determine if the components of the phrase are adjacent to one another in the article being processed. If it is determined in step 138 that the article contains the phrase, control is passed back to step 132 and the foregoing loop is repeated. If it is determined that the article does not containing the phrase, control is passed to step 140 where the corresponding article identifier is removed from the set. Control is then passed back to step 132 and the foregoing loop is repeated until all article identifiers in the set of retrieved article identifiers have been processed as detected in step 134. When this occurs, control is then returned to step 110 of FIG. 7.

Returning now to FIG. 7 to complete the description of the processing flow, the loop illustrated in FIG. 7 is repeated until all "phrase add" changes to the lexicon 22 have been processed as detected in step 112. When this occurs, control is then returned to step 40 of FIG. 3.

As discussed above, the sets of article identifiers which were retrieved in step 36 and step 38 indicating that these represent the articles that are affected by the subset of changes to the lexicon 22 being processed are combined by ORing the two sets together in step 40. A test is then performed in step 42 to determine if the combined set is empty indicating that no articles are affected by the subset of changes being processed. If the combined set is not empty, control passes to step 44 where the actual procedure of updating the citation/phrase index 26 and the concordance index 28 takes place. This step invokes a separate software module which is fully illustrated in FIG. 9.

Reference is now made to FIG. 9 to describe the processing flow for the software module that updates the citation/phrase index 26 and the concordance index 28. The processing flow illustrated in FIG. 9 comprises a loop which is repeated until each article represented by the set of articles identifiers created in step 40 of FIG. 3 has been reindexed.

Upon entering the processing flow, the next, or if this is the first time through the loop, the first article identifier from the set of article identifiers compiled in step 40 of FIG. 3 is selected in step 150. The article identifiers are dealt with on an individual basis so that all changes to the lexicon 22 applicable to the article represented by the selected article identifier are made to the indices 26 and 28 at one time. It is determined in step 152 if there are any more article identifiers left in the set to be processed. If there are more, control is passed to step 154 to determine which lexicon changes apply to the current article being processed. Control is then passed to step 156 where the changes to the lexicon 22 that are applicable to the current article are made to the citation/phrase index 26 and the concordance index 28 in the memory 13. The processing that is involved in step 156 is performed by a separate software module which is illustrated in FIG. 10.

Figure 10:
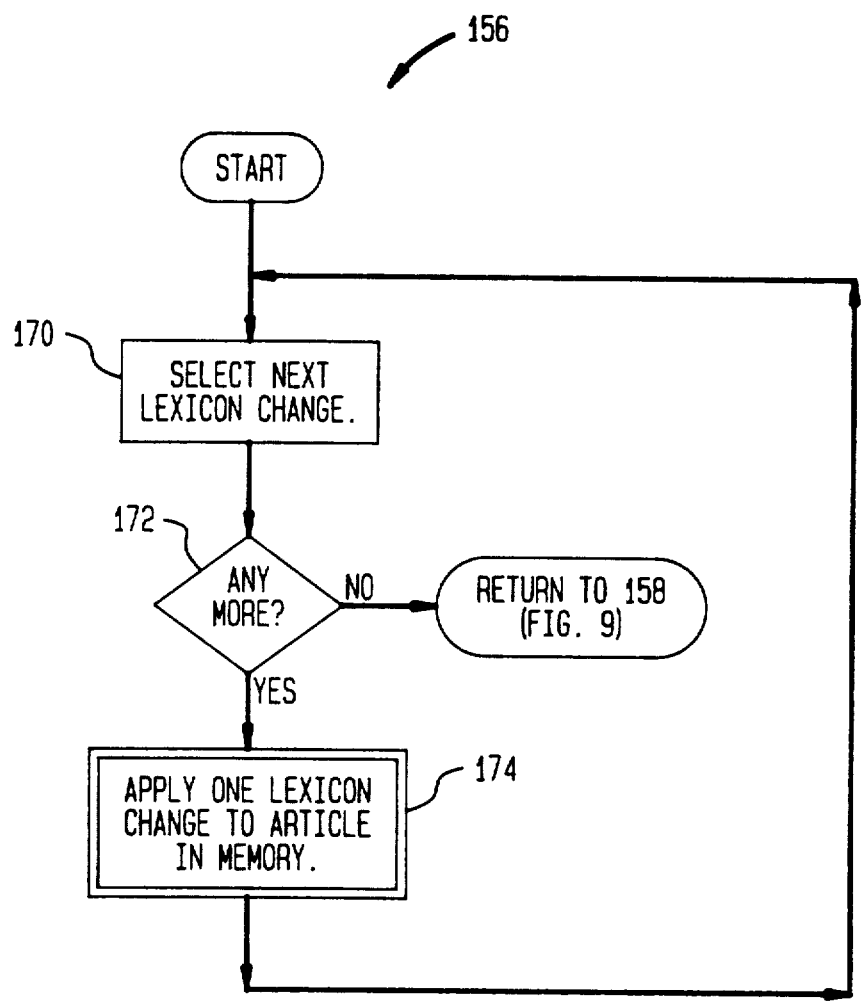
FIG. 10 illustrates the processing flow for applying lexicon changes to an article index in memory.

Reference is now made to FIG. 10 to illustrate the process of applying changes to the lexicon 22 to the citation/phrase index 26 and the concordance index 28. Upon entering the processing flow of FIG. 10 from step 154 of FIG. 9, the next, or if this is the first time through, the first lexicon change applicable to the current article is selected in step 170. The lexicon changes are reindexed one change at a time. It is determined in step 172 if there are any more lexicon changes applicable to the current article left to be processed. If there are more, control is passed to step 174 to apply the selected lexicon change to the citation/phrase index 26 and the concordance index 28. The processing that is involved in step 174 is performed by a separate software module which is illustrated in FIG. 11.

Figure 11:
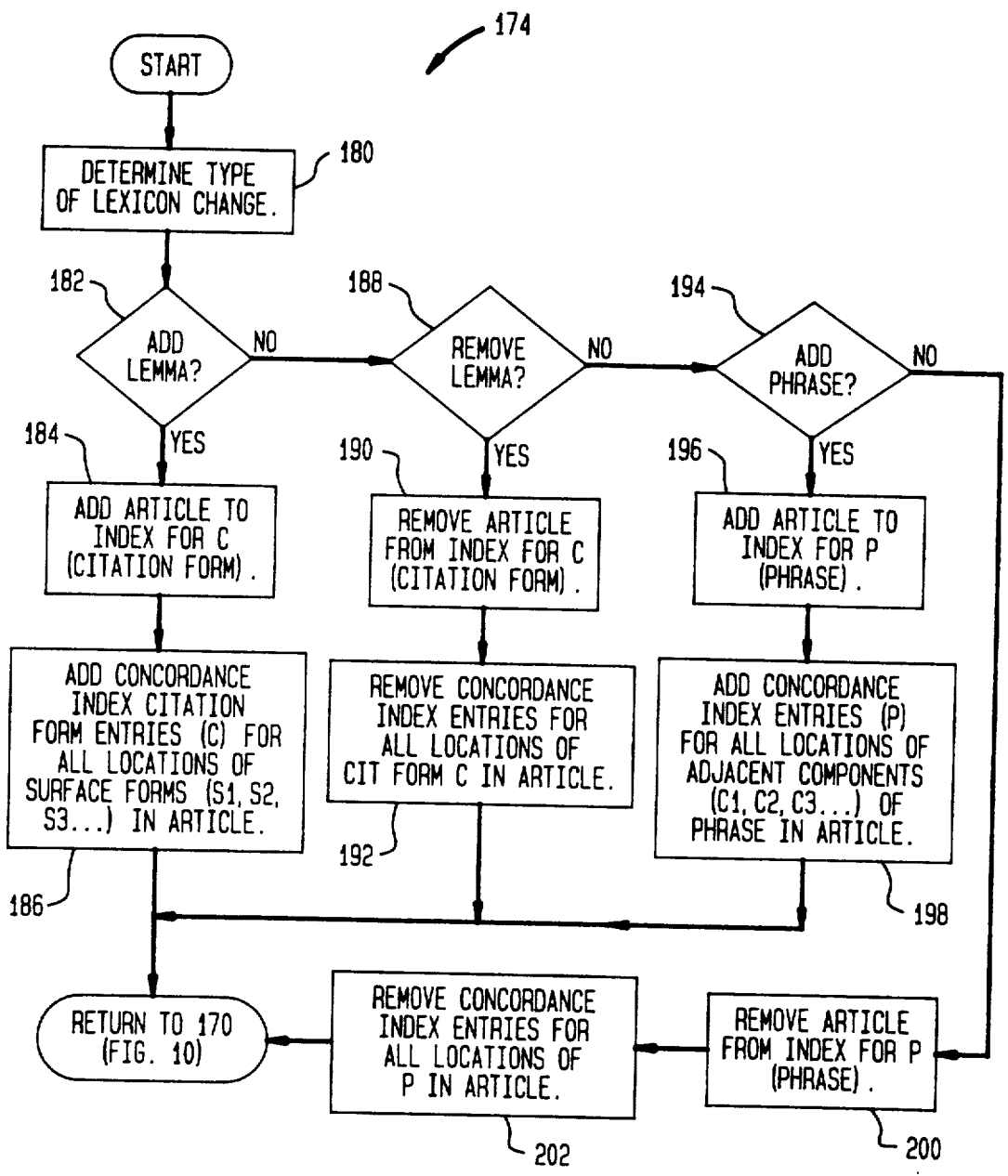
FIG. 11 illustrates the processing flow for applying one lexicon change to an article index in memory.

Reference is now made to FIG. 11 to illustrate the processing performed to add one lexicon change to the citation/phrase index 26 and the concordance index 28. All of the changes made in FIG. 11 are made in the memory 13 without affecting the disk 14. Upon entering the processing flow from step 172 of FIG. 10, the type of lexicon change being processed is determined in steps 180, 182, 188 and 194. In step 182, a test is performed to determine if the change indicates an "add lemma to the lexicon 22" operation. If the change is an "add lemma," then control is passed to step 184 to add the current article being processed to the citation/phrase index 26 for the citation form of the lemma. Then the concordance index 28 is updated for the current article in step 186. Since the concordance index 28 contains the locations of all of the surface/citation/phrase in the text of a particular article, it already implicitly contains the locations of the citation form being added to the citation/phrase index 26 and the concordance index 28 as locations for the corresponding surface forms. Thus, to add a concordance entry for a new citation form, a set of locations are generated by ORing together the sets of locations of all of the corresponding surface forms. Control is then returned to step 170 in FIG. 10 to continue processing the current article.

If it is determined in step 182 that the change does not indicate an "add lemma to the lexicon 22" operation, then control passes to step 188 to determine if the change indicates a "remove lemma from the lexicon 22" operation. If it does, the article is removed from the citation/phrase index 26 for the citation form removed in step 190. Next, all entries in the concordance index 28 for all locations of the citation form in the current article are removed in step 192. Control is then returned to step 170 in FIG. 10 to continue processing the current article.

If it is determined in step 188 that the change does not indicate a "remove lemma from the lexicon 22" operation, then control passes to step 192 to determine if the change indicates a "phrase add to the lexicon 22" operation. If the change is a "phrase add," control is passed to step 196 to add the current article being processed to the citation/phrase index 26 for the added phrase. Then the concordance index 28 is updated for the current article in step 198. The locations of every component of the phrase are located in the concordance index 28 for the article. A new location comprising the span of component locations is added to the concordance index 28 for the phrase in the locations where it is indicated that the phrase exists in the text by adjacency and order. Control is then returned to step 170 in FIG. 10 to continue processing the current article.

If it is determined in step 194 that the change does not indicate a "phrase add to the lexicon 22," then the current lexicon change being processed is a "phrase remove from the lexicon 22" operation. Control passes to step 200 where the article identifier is removed from the citation/phrase index 26 for the phrase removed from the current article. Next, all entries in the concordance index 28 for all locations of the phrase removed in the current article are removed in step 202. Control is then returned to step 170 in FIG. 10 to continue processing the current article.

Returning now to FIG. 10 to complete the description of the processing flow, control is passed back to step 170 from FIG. 11 where the loop applying lexicon changes applicable to the current article is repeated until it is determined in step 172 that there are no more lexicon changes applicable to the current article that have not been processed. Control is then passed back to step 158 in FIG. 9 where it is determined whether a predetermined number of articles ("N") have been processed in the memory 13. The predetermined number is selected to be as large as possible to facilitate the updating process while being small enough so as to avoid repeating the entire reindexing procedure if a system failure occurs while reindexing is in progress. If it is determined in step 160 that the predetermined number of articles have been processed, the updated portions of the citation/phrase index 26 and the concordance index 28 are stored to the disk 14 in step 162.

Control is then passed back to step 150 where the steps of FIG. 9 are repeated until it is determined in step 152 that there are no article identifiers in the set of article identifiers that have not been processed. When this occurs, control is then passed back to step 46 in FIG. 3 where the value stored in the "last_index_update" variable is set equal to the value of the time stamp of the most recent change to the lexicon 22 in the selected subset. Control is then passed back to step 30 where the foregoing process is repeated until all changes to the lexicon 22 since the last lexicon update as evidenced by the current value of the last_index_update variable have been processed.

It should be understood that the foregoing description of the present invention is meant to be illustrative only. Thus, although only a few examples of the present invention have been described in detail, it is clear that the features of the present invention may be adapted to many different situations without departing from the spirit of the invention.

What is claimed is:

1. A method of reindexing a plurality of indices representative of information stored in an information retrieval system, the system including memory having a database stored therein, the database being logically divided to include the plurality of indices, an information database having information objects stored therein and a lexicon, the lexicon including a plurality of data items and groups of data items that appear in the information database, the method comprising the steps of:
    (a) maintaining a predetermined time variable representative of the last time the plurality of indices were reindexed;
    (b) making a plurality of changes to the lexicon;
    (c) attaching a time stamp to each one of the plurality of changes to the lexicon to indicate when the change was made to the lexicon;
    (d) locating information objects in the information database that are affected by the plurality of changes to the lexicon;
    (e) reindexing portions of the plurality of indices representative of the information objects located in step (d) to reflect the changes in the lexicon;
    (f) updating the predetermined time variable to equal the value of the time stamp of a most recent one of the plurality of changes to indicate the changes to the lexicon that have been processed; and
    (g) repeating steps (c)–(f) until all changes to the lexicon after the predetermined time have been applied to the plurality of indices.

2. The method of claim 1 wherein the step of making a plurality of changes to the lexicon further comprises adding a plurality of data items to the lexicon, each one of the plurality of data items having an indicator associated therewith to indicate when the data item was added to the lexicon.

3. The method of claim 1 wherein the step of making a plurality of changes to the lexicon further comprises adding groups of data items to the lexicon, each one of the groups of data items having an indicator associated therewith to indicate when each one of the groups of data items was added to the lexicon.

4. The method of claim 1 wherein the step of making a plurality of changes to the lexicon further comprises removing a plurality of data items from the lexicon, each one of the plurality of data items having an indicator associated therewith to indicate when the data item was removed from the lexicon.

5. The method of claim 1 wherein the step of making a plurality of changes to the lexicon further comprises removing groups of data items from the lexicon, each one of the groups of data items having an indicator associated therewith to indicate when each one of the groups of data items was removed from the lexicon.

6. A method of reindexing a plurality of indices representative of information stored in an information retrieval system, the system including memory having a database stored therein, the database being logically divided to include the plurality of indices, an information database having information objects stored therein and a lexicon, the lexicon including a plurality of data items and groups of data items that appear in the information database, the method comprising the steps of:
 (a) maintaining a predetermined time variable representative of the last time the plurality of indices were reindexed;
 (b) making a plurality of changes to the lexicon;
 (c) attaching a time stamp to each one of the plurality of changes to the lexicon to indicate when the change was made to the lexicon;
 (d) selecting a subset of the plurality of changes made to the lexicon after the predetermined time variable;
 (e) locating information objects in the information database that are affected by the subset of the plurality of changes to the lexicon;
 (f) reindexing portions of the plurality of indices representative of the information objects located in step (e) to reflect the changes in the lexicon;
 (g) updating the predetermined time to equal the value of the time stamp of a most recent one of the plurality of changes in the selected subset to indicate the changes to the lexicon that have been processed; and
 (h) repeating steps (c)-(g) until all changes to the lexicon after the predetermined time have been applied to the plurality of indices.

7. The method according to claim 6 wherein the step of selecting a subset of the plurality of changes made to the lexicon after the predetermined time variable is carried out by selecting a predetermined number of changes.

8. The method according to claim 6 wherein the information retrieval system further includes a disk drive coupled to the memory, further comprising the step of storing the reindexed portions to disk after a predetermined number of portions of the plurality of indices have been reindexed after the step of reindexing portions of the plurality of indices representative of the information objects.

9. A method of maintaining a consistent view of a database while reindexing a plurality of indices representative of information stored in an information retrieval system, the system including memory having the database stored therein, the database being logically divided to include the plurality of indices, an information database having information objects stored therein and a lexicon, the lexicon including a plurality of data items and groups of data items that appear in the information database, the method comprising the steps of:
 (a) maintaining a predetermined time variable representative of the last time the plurality of indices were reindexed;
 (b) attaching a plurality of first time stamps to each one of a plurality of entries in the lexicon and the plurality of indices, the plurality of first time stamps being representative of the time each entry was added to the lexicon and the plurality of indices;
 (c) making a plurality of changes to the lexicon in a non-destructive manner to maintain prior versions of each one of the plurality of entries in the lexicon;
 (d) attaching a plurality of second time stamps to each one of the plurality of changes to the lexicon and to the plurality of indices to indicate when the changes were made;
 (e) locating information objects in the information database that are affected by the plurality of changes to the lexicon;
 (f) reindexing portions of the plurality of indices representative of the information objects located in step (e) to reflect the changes in the lexicon in a non-destructive manner to maintain prior versions of each one of the plurality of entries in the plurality of indices;
 (g) processing a user query to retrieve information objects from the information database by accessing only those entries of the lexicon and the plurality of indices whose respective one of the plurality of the first and second time stamps is less than or equal to the predetermined time variable to provide the user with a consistent view of the lexicon and the plurality of indices;
 (h) updating the predetermined time variable to equal to the value of the time stamp of a most recent one of the plurality of changes to indicate the changes to the lexicon that have been processed; and
 (i) repeating steps (e), (f) & (h) until all changes to the lexicon after the predetermined time have been applied to the plurality of indices.

10. An information retrieval system comprising:
 a memory system;
 a database stored in said memory system, said database being logically divided to include a plurality of indices representative of information stored in an information database having information objects stored therein and a lexicon, the lexicon including a plurality of words and phrases that appear in the information database; and
 a computer having memory associated therewith, the computer being coupled to the memory system, the computer including:
  means for maintaining a predetermined time variable representative of the last time the plurality of indices were reindexed in said memory associated with said computer;
  means for making a plurality of changes to the lexicon and for attaching a time stamp to each one of the plurality of changes to indicate when the change was made to the lexicon;
  means for locating articles in the articles database that are affected by the plurality of changes to the lexicon;
  means for reindexing portions of the plurality of indices representative of the articles affected by the changes to the lexicon to reflect the changes in the lexicon; and means for updating the predetermined time variable to equal the value of the time stamp of a most recent one of the plurality of changes to indicate changes to the lexicon have been processed.

11. An information retrieval system comprising:

a memory system;

a database stored in said memory system, said database being logically divided to include a plurality of indices representative of information stored in an information database having information objects stored therein and a lexicon, the lexicon including a plurality of words and phrases that appear in the information database; and a computer having memory associated therewith, the computer being coupled to the memory system, the computer including:

means for maintaining a predetermined time variable representative of the last time the plurality of indices were reindexed in said memory associated with said computer;

means for making a plurality of changes to the lexicon and for attaching a time stamp to each one of the plurality of changes to indicate when the change was made to the lexicon;

means for selecting a subset of the plurality of changes made to the lexicon after the predetermined time variable;

means for locating articles in the articles database that are affected by the plurality of changes to the lexicon;

means for reindexing portions of the plurality of indices representative of the articles affected by the changes to the lexicon to reflect the changes in the lexicon; and means for updating the predetermined time variable to equal the value of the time stamp of a most recent one of the plurality of changes in the selected subset to indicate changes to the lexicon have been processed.

12. The information retrieval system according to claim 11 wherein the subset comprises a predetermined number of changes from the plurality of changes.

13. The information retrieval system according to claim 11 further comprises a disk drive coupled to the memory, and the computer further including means for storing the reindexed portions to disk after a predetermined number of portions of the plurality of indices have been reindexed.

14. An information retrieval system comprising:

a memory system;

a database stored in said memory system, said database being logically divided to include a plurality of indices representative of information stored in an information database having information objects stored therein and a lexicon, the lexicon including a plurality of words and phrases that appear in the information database; and a computer having memory associated therewith, the computer being coupled to the memory system, the computer including:

means for maintaining a predetermined time variable representative of the last time the plurality of indices were reindexed;

means for attaching a plurality of first time stamps to each one of a plurality of entries in the lexicon and the plurality of indices, the plurality of first time stamps being representative of the time each entry was added to the lexicon and the plurality of indices;

means for making a plurality of changes to the lexicon in a non-destructive manner to maintain prior versions of each one of the plurality of entries in the lexicon;

means for attaching a plurality of second time stamps to each one of the plurality of changes to the lexicon and to the plurality of indices to indicate when the changes were made;

means for locating information objects in the information database that are affected by the plurality of changes to the lexicon;

means for reindexing portions of the plurality of indices representative of the information objects to reflect the changes in the lexicon in a non-destructive manner to maintain prior versions of each one of the plurality of entries in the plurality of indices;

means for processing a user query to retrieve information objects from the information database by accessing only those entries of the lexicon and the plurality of indices whose respective one of the plurality of first and second time stamps is less than or equal to the predetermined time variable to provide the user with a consistent view of the lexicon and the plurality of indices; and means for updating the predetermined time variable to equal the value of the time stamp of a most recent one of the plurality of changes to indicate the changes to the lexicon that have been processed.

* * * * *